United States Patent Office 2,922,703
Patented Jan. 26, 1960

2,922,703

INCENDIARY FUELS

Eldon E. Bauer and Geoffrey Broughton, Rochester, N.Y., assignors to the United States of America as represented by the Secretary of War No Drawing. Application August 1, 1947
Serial No. 765,644

2 Claims. (Cl. 44—7)

This invention relates to incendiary fuels, to thickening agents therefor, and to ways and means whereby the uniformity, consistency and stability of these products may be improved.

Prior to World War II, paraffin liquids, such as gasoline and kerosene, were generally thickened or gelled with natural rubber in order to render them suitable for use in shells, bombs, hand grenades and flame throwers since the unthickened liquids would not adhere to the target as a sticky mass because of its liquidity, and could not be hurled to a sufficient distance by the flame thrower because of its tendency to break into droplets and vaporize in the air.

The desired consistency, of course, varies greatly according to the manner in which the fuel is to be applied. For instance, a higher viscosity is generally desired for shells and hand grenades than in flame throwers where the incendiary must be projected under pressure through a nozzle and hurled through the air in the form of a stream to a substantial distance. As the result of much experience and experimentation, however, it has been found extremely desirable, if not absolutely necessary, to impart to the fuel compositions consistencies which should be selected according to the manner in which these fuels are to be used.

During World War II, however, an enemy nation quickly seized our main source of rubber and consequently insufficient rubber was available to this Nation and its Allies. In this emergency it was discovered that a more or less satisfactory incendiary fuel thickening agent could be made with gelled compositions consisting usually of a hydrocarbon liquid, soap, fatty acids and other minor ingredients.

Unfortunately, however, these thickening agents or gels did not have the desired stability insofar as their consistency and chemical activity were concerned. They tended to liquefy or "separate out" on slight increases in their moisture content, to thicken when chilled and to become more mobile when heated. It also developed that these gels and the thickened liquid incendiaries formed by the addition of these gels were not sufficiently resistant to the deleterious effect of xylenol, amines, potassium acetate, acid soldering flux, and other substances to which they sometimes became exposed at the time of the compounding, storage and preparation for use in the field.

Many attempts have heretofore been made to stabilize these incendiary compositions with additives, heat and chemical treatments. Among other things, a large number of well-known dehydrating crystals and granules were tried out in various ways but in each case the dehydrating agent used introduced new difficulties. Magnesium sulfate formed hard scales and flakes, broke down the gel, and was exceedingly slow in reaching an equilibrium in the composition. Other dehydrating agents proved less effective. In short, none of the crystal and granular dehydrating agents experimented with would maintain the desired consistency and chemical stability of these compositions under both arctic and tropical temperature conditions, which vary from —40° to 125° F.

One object of this invention is to provide a means and method for making a thickened hydrocarbon fuel having a stabilized consistency.

Another object is the provision of a thickened hydrocarbon fuel having a stabilized consistency.

A further object is the provision of a means and a process whereby the consistency of incendiary hydrocarbon fuels and their thickening agents may be maintained within desirable limits.

A further object is the provision of a gelled stabilizing agent for compositions of the class described which reduces or substantially prevents the above-mentioned undesirable chemical activity of incendiary compositions in which it is incorporated.

A further object is the provision of an improved method of incorporating a chemically non-reactive dehydrating agent in incendiary hydrocarbon liquids and their thickening agents to increase the consistency and stability of these compositions without forming scales or flakes in the composition.

The present invention consists in adding dry, finely pulverized or divided silica gel to liquid incendiary fuels and their thickening agents or gels in order to stabilize their consistency and prevent or substantially reduce their tendency to chemically react in a deleterious manner. This silica gel may be either mixed with the thickening gel or with the treated incendiary fuel at the time the gel is mixed with the hydrocarbon fuel liquid.

When mixed with the gel, it may be admixed in a ratio by weight of from one part of silica gel to two parts of the thickening gel to one part of silica gel to sixteen parts of the thickening agent, according to the inherent stability of the gel to be treated. However it has been found that a ratio of 1:4 or a 25% addition of silica gel is usually satisfactory and may be depended upon to give excellent results. When the silica gel is to be admixed directly with the fuel composition at the time the thickening agent is added, it has been found that an addition of from 1% to 1.5% according to the percentage of water in the composition usually gives the desired results. However if the composition has an unusually high moisture content it may be desirable to add an additional 0.5% of silica gel.

The moisture in the silica gel should not exceed 6%, and preferably not more than 5.5%, of the weight of the silica gel. It should, at least, pass through a 28 inch mesh sieve. In very mobile compositions the silica gel may be advantageously reduced to an almost impalpable form which may be made by very finely grinding the gel and using that portion which may be sifted through a 200-mesh sieve. In order to obtain the most desirable results, the silica gel should be stirred or otherwise agitated a sufficient period of time in the composition for the silica gel to become fully suspended in the mixture.

After being stirred and agitated sufficiently and being given a short period of rest the composition, if it is to be used in bombs, shells or hand grenades, may be poured into these weapons and stored for use when needed.

However, if the composition is a liquid fuel incendiary designed for use in flame throwers, it should be permitted to remain at rest, either in the vessel in which the composition is mixed or in some other convenient container for several hours and then preferably strained before it is poured into the tanks of the flame throwers since any incompletely suspended particles left in the composition might become trapped in the nozzles or other apertures of the flame throwers and prevent their proper operation.

It has been found, by test, that the resultant compositions, in comparison with similar liquid incendiaries, are much improved products and particularly so insofar as the stability of their consistencies are concerned. It has also been discovered that the addition of the silica gel, for some reason which is not fully understood, favorably modifies the consistencies of the compositions in a manner which cannot be attributed solely to the dehydrating characteristic of the silica gel.

The incorporation of silica gel in these compositions has also been found by test to provide a protective agent against undesired chemical reactions. More specifically it tends to prevent the breakdown of the fuel compositions when they are subjected to exploded powder gases or to the deleterious effect of alcohols, phenols, amines, potassium acetates, soldering flux and various rust preventives with which they become physically associated in production, storage and use.

We claim:

1. In a thickened incendiary fuel gel comprising essentially a soap thickener and a fuel of the group consisting of gasoline and kerosene, the improvement which comprises the addition thereto of between 1.0 and 2.0% by weight of a silica gel containing less than 6% moisture, to stabilize the thickened fuel gel toward the deleterious action of chemical reagents.

2. In a thickened incendiary fuel gel comprising essentially a soap thickener and gasoline, the improvement which comprises the addition thereto of between 1.0 and 2.0% by weight of a silica gel containing less than 6% moisture, to stabilize the thickened fuel gel toward the deleterious action of chemical reagents.

References Cited in the file of this patent

UNITED STATES PATENTS

| | | |
|---|---|---|
| 1,999,397 | Chieton | Apr. 30, 1935 |
| 2,196,021 | Merrill | Apr. 2, 1940 |
| 2,260,625 | Kistler | Oct. 28, 1941 |
| 2,426,118 | Parker et al. | Aug. 19, 1947 |
| 2,606,107 | Fieser | Aug. 5, 1952 |